Nov. 23, 1954

E. T. STROM 2,695,192

TAIL GATE CONSTRUCTION

Original Filed Aug. 21, 1947

INVENTOR
Edgar T. Strom
BY Robert M. Dunning
ATTORNEY

Nov. 23, 1954  E. T. STROM  2,695,192
TAIL GATE CONSTRUCTION
Original Filed Aug. 21, 1947  2 Sheets-Sheet 2

INVENTOR
Edgar T. Strom
BY Robert M. Denning
ATTORNEY

United States Patent Office 2,695,192
Patented Nov. 23, 1954

2,695,192

TAIL GATE CONSTRUCTION

Edgar T. Strom, Beulah, N. Dak.

Original application August 21, 1947, Serial No. 769,898. Divided and this application November 6, 1952, Serial No. 319,039

9 Claims. (Cl. 296—50)

This invention relates to an improvement in tail gate construction and deals particularly with a tail gate used on hay barges or the like.

In my previously filed application, Serial No. 769,898 filed August 21, 1947 for "Barge", now Patent 2,617,683, I described a hay barge which is capable of carrying a considerable tonnage of hay and which is designed so that the contents could be easily unloaded. In this application, of which the present application is a division, the present tail gate construction was illustrated. In the present drawings, the illustration has been clarified, although the construction remains the same.

An object of the present invention resides in the provision of a tail gate which is pivotally supported at one end thereof and which may be pivoted into closed position extending across the rear of the barge or other such vehicle. When the tail gate is opened, one end of the same is detached from the rear of the vehicle and the tail gate is swung outwardly to extend parallel to a wall of the barge. By pushing the tail gate longitudinally of the barge the tail gate will remain in an inoperative position out of the way of the loading and unloading operations. When supported to extend along the side of the truck, the tail gate can be carried with the rear of the body open. The tail gate is also properly supported upon tilting of the body as described in the previous application.

A feature of the present invention resides in the provision of a track extending across the tail gate near the upper end thereof and a second track supported to extend along the side of the vehicle body. A pulley is provided on the tail gate which is movable along the track mounted on the side of the body. A second pulley is suspended from the body to ride along the track on the tail gate. The track mounted upon the side of the body is outwardly of the pulley, riding upon the track on the tail gate so that in closed position of the tail gate, the two pulleys may be in laterally aligned position.

A feature of the present invention resides in the provision of a tail gate which may be supported from a track, the ends of which may be secured in fixed position across the opening in the body or may be supported longitudinally of the body.

A further feature of the present invention resides in the provision of a tail gate which may be supported to extend transversely across the rear of the body or may be slidably supported for movement along a wall of the body at right angles to its closed position.

These and other objects and novel features of my invention will be more clearly and fully set forth in the following specification and claims.

In the drawings forming a part of my specification:

Figure 1:
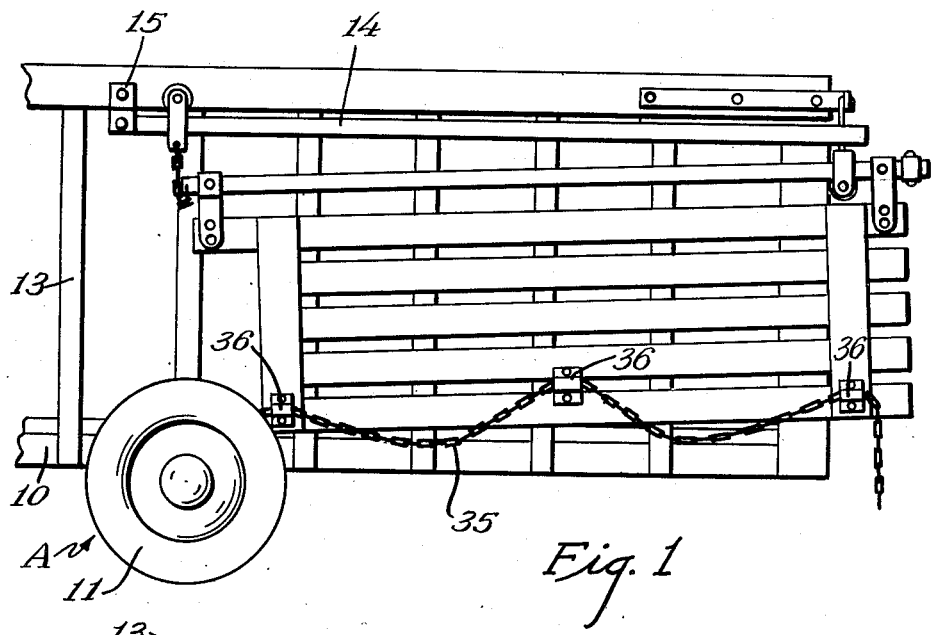
Figure 1 is a side elevational view of a barge or similar structure showing the tail gate thereof in open position.
Figure 2:
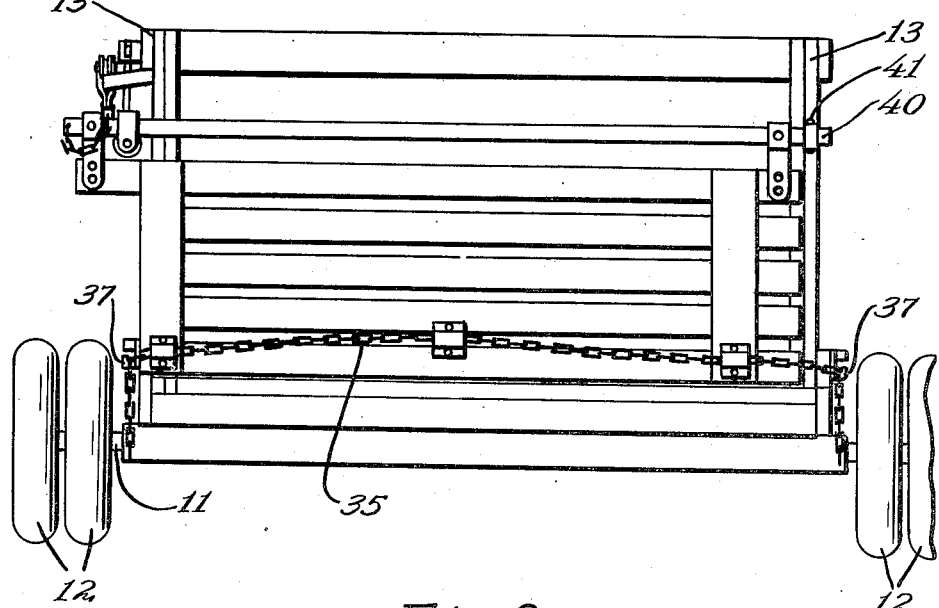
Figure 2 is a rear elevation view of the barge showing the tail gate in closed position.
Figures 3, 4:
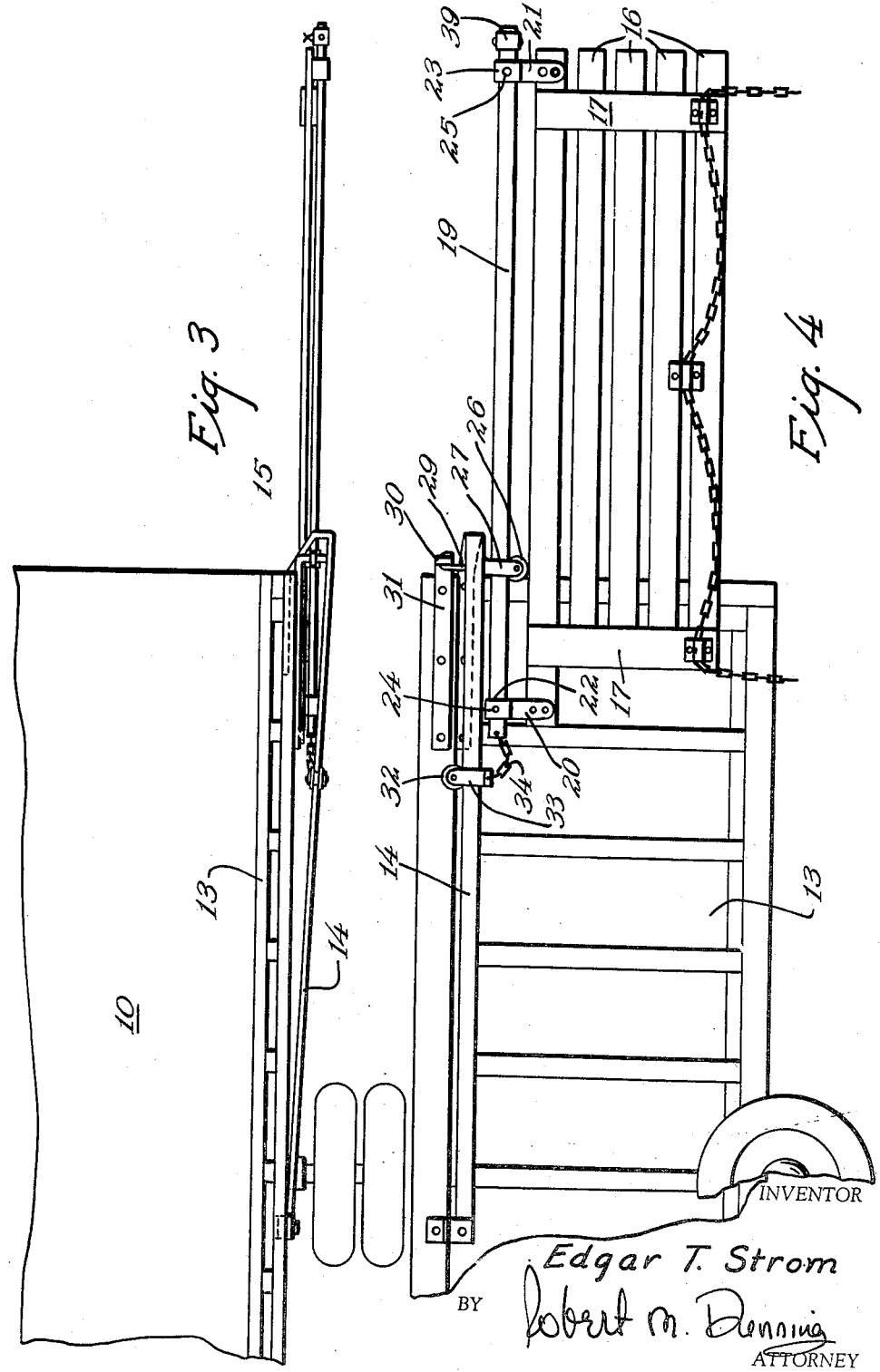
Figure 3 is a plan view showing the tail gate in an intermediate position.
Figure 4 is a side elevation view showing the tail gate in a partially open position.

The barge is illustrated in general by the letter A and includes an elongated platform 10 having a transversely extending axle 11 extending across the same intermediate the ends of the platform. Wheels 12 are mounted upon the axle 11 to support the same. In the particular construction illustrated the barge is tiltable about the axis of the axle.

The barge also includes side walls 13 of solid or open construction as desired. The side walls 13 extend in parallel relation longitudinally of the barge on opposite sides of the platform 10.

A track or rail 14 is supported to extend substantially parallel to one side wall 13 and spaced therefrom. A bracket 15 extends outwardly from the side wall 13 to support the forward end of the track or rail 14. A suitable bracket 15 or rail extension extends inwardly from the rail 14 and is secured to the side wall 13. The rail 14 may comprise a pipe or may comprise a rectangular bar as desired.

The tail gate is shown as including a series of transversely extending slats 16 which are held in properly spaced relation by vertical members 17. A track or rail 19 is supported above the top of the tail gate by means of brackets 20 and 21. If desired the brackets 21 may be provided with bearings 22 and 23 which encircle the track or rail 19 and set screws such as 24 and 25 may hold the brackets from longitudinal movement upon this rail. The track or rail 19 may be tubular in section or may be rectangular if preferred.

A pulley wheel 26 is mounted in a block 27 which is provided with an upwardly extending hook 29 designed for support by the outwardly extending end 30 of an angle bracket 31. This angle bracket 31 is secured to the adjacent wall 13 and extends outwardly therefrom and slightly rearwardly thereof so that the pulley 26 is slightly behind the extremity of the wall 13.

A pulley 32 is mounted in a pulley block 33 connected by a flexible connection 34 to the end of the track or rail 19. Thus the tail gate is normally supported by two pulleys. One pulley 26 rides along the undersurface of the track or rail 19 of the tail gate, while the other pulley rides along the upper surface of the track or rail 14.

It will be noted that the pulley 26 is supported more closely adjacent to the wall 13 than is the pulley 32. As a result of this and as a result of the fact that the track 14 is above the level of the tail gate, both of the pulleys 32 and 26 may extend into side by side relationship when the tail gate is in closed position.

A chain or other fastening means 35 is supported by bearings 36 on the tail gate and extends beyond the tail gate. Hooks such as 37 are provided on each of the side walls 13 near the lower extremity thereof and at the rear end thereof to engage the chain 35 to hold the lower end of the tail gate in position.

A fastener 39 is provided on the free end of the track or rail 19 and a cooperable fastener 40 is mounted upon the side wall 13 opposite that bearing the track 14. A detachable fastening means is provided such as a pin 41 which may extend through the members 39 and 40 to hold the free end of the tail gate in closed position.

In operation when it is desired to open the tail gate, the ends of the chain 35 are first detached from the hooks 37. The pin 41 is next removed from the fastening means 39, 40. The tail gate is then swung through substantially ninety degrees so as to extend parallel to the side walls 13. During this action the pulley block 27 pivots about the hook 29 and the flexible connection 24 may swing the pulley 32 somewhat out of vertical position. The tail gate is next pushed forwardly of the vehicle. This forward movement of the tail gate acts through the flexible connection 34 and the pulley block 33 to move the pulley 32 forwardly along the track 14. At the same time, the pulley 26 engages beneath the track or rail 19 acting as a further support for the tail gate. It will be noted that at the time the tail gate is in closed position, half of the weight of the tail gate is supported by the pulleys and the other half must be supported by the operator. However, as the tail gate is moved rearwardly the weight upon the operator decreases and when the tail gate is approximately half toward open position, all of the weight is supported by the two pulleys.

This type of tail gate is particularly useful in rear loading vehicles where it is essential that the tail gate be entirely out of the path of material passing into or out of the body. It should also be noted that the tail gate may be supported in open position during movement of the vehicle if desired. The tail gate support also functions to support the tail gate when the tail gate is tilted or inclined as described in my copending application.

In accordance with the patent statutes, I have described the principles of construction and operation of my tail gate construction, and while I have endeavored to set forth the best embodiment thereof, I desire to have it understood that obvious changes may be made within the scope of the following claims without departing from the spirit of my invention.

I claim:

1. A tail gate construction for use in conjunction with a vehicle having a wall and an opening at right angles to said wall, the tail gate including a tail gate body having a rail extending longitudinally thereof, spaced means pivotally supporting said rail for pivotal movement on a horizontal axis normal to said wall, one of said spaced means being supported by said wall and pivotally supporting said tail gate body for pivotal movement about a vertical axis, said one means slidably supporting said rail whereby said tail gate body may be slid parallel to said wall.

2. A tail gate construction for use in conjunction with a vehicle having spaced walls and an opening at right angles to said walls and therebetween, the tail gate including a tail gate body having a rail extending longitudinally therefrom adjacent the upper edge thereof, a means secured to each wall pivotally supporting said rail for pivotal movement on an axis substantially normal to said walls, one of said supporting means including a roller, and means pivotally supporting said roller for pivotal movement about a vertical axis, whereby said tail gate body may be turned at right angles, said roller slidably supporting said rail so that said rail and tail gate may move along the wall supporting said one supporting means.

3. The structure described in claim 2 and including a track extending along the wall supporting said one supporting means, and means movable on said track and secured to said tail gate body for assistance in supporting said tail gate body.

4. A tail gate for use in conjunction with a vehicle having a wall and an opening at right angles to said wall, a tail gate including a tail gate body having a rail extending longitudinally thereof, a pulley, means pivotally supporting said pulley on said wall adjacent to one end of said opening, a pulley supported by said tail gate at the end thereof adjacent to said wall, a track extending longitudinally of said wall on which said second pulley is engaged, the first named pulley moving along said rail on said tail gate as said second pulley moves along said track.

5. A tail gate construction for vehicles having a body including a wall and an opening in the body at right angles to the wall, the tail gate including a rail extending longitudinally thereof, a pulley supported by said wall adjacent to one side of said opening, said pulley being engaged with said rail to move longitudinally thereof upon movement of said tail gate, at track extending longitudinally of said wall, and a second pulley on the end of said tail gate adjacent said wall in closed position of the tail gate, said pulley being movable along said track when said tail gate is swung parallel to said wall, said pulleys supporting said tail gate in open position thereof when said tail gate extends along said wall and said pulleys supporting one end of said tail gate in closed position of the tail gate at right angles to said wall.

6. The construction described in claim 5 and including means for supporting the other end of said tail gate in closed position thereof.

7. A tail gate for use with a vehicle having parallel walls and an opening therebetween, said tail gate including a rail extending longitudinally thereof, a pulley supported at the rear end of one of said walls at one side of said opening, said pulley engaging said rail to support one end of said tail gate, a track extending longitudinally of said wall and spaced therefrom, a pulley mounted upon said track for movement longitudinally thereof, means connecting said last named pulley and said one end of said tail gate, said tail gate being supported by said pulleys and swingable from closed position connecting said walls to a position parallel to said walls, the first named pulley riding along said rail and said last named pulley riding along said track upon movement of said tail gate longitudinally of said track.

8. The construction described in claim 7 and in which said rail is supported at the upper extremity of said tail gate.

9. The structure described in claim 7 and including a fastening means at the other end of said tail gate engageable with the other wall to hold the tail gate in closed position.

References Cited in the file of this patent

UNITED STATES PATENTS

| Number | Name | Date |
|---|---|---|
| 972,412 | Taussig | Oct. 11, 1910 |
| 1,262,159 | Barber | Apr. 9, 1918 |
| 1,414,843 | Voss | May 2, 1922 |
| 1,778,943 | Hoffman | Oct. 21, 1930 |
| 2,184,597 | Iglehart | Dec. 26, 1939 |